A. Quinn,

Pea Picker.

No. 87,705. Patented Mar. 9, 1869.

Witnesses
Chas. A. Pettit
S. A. Kenon

Inventor
Abner Quinn
per Munn & Co.
Attorneys

UNITED STATES PATENT OFFICE.

ABNER QUINN, OF WILMINGTON, NORTH CAROLINA, ASSIGNOR TO HIMSELF AND A. E. WRIGHT.

Letters Patent No. 87,705, dated March 9, 1869.

IMPROVEMENT IN PEA-PICKER.

The Schedule referred to in these Letters Patent and making part of the same.

*To all whom it may concern:*

Be it known that I, ABNER QUINN, of Wilmington, in the county of New Hanover, and the State of North Carolina, have invented a new and useful Improved Pea-Picker; and I do hereby declare the following to be a full, clear, and exact description of the same, sufficient to enable one skilled in the art to which my invention belongs, to construct and operate the same, reference being had to the accompanying drawings, forming part of this specification, in which—

Figure 1:
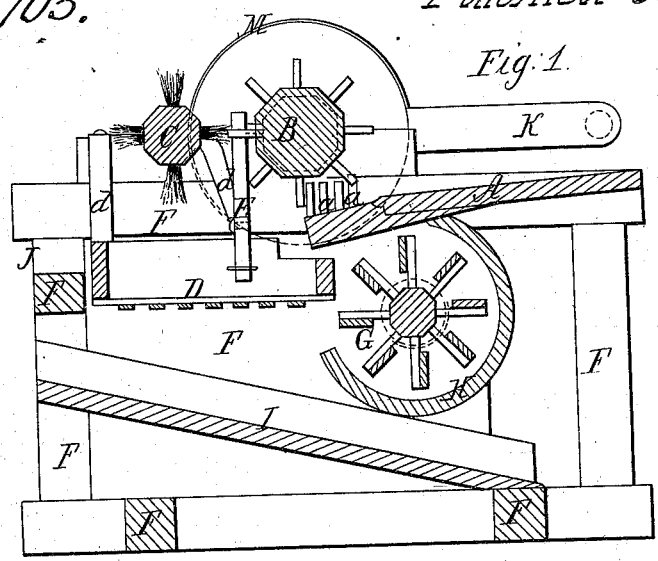
Figure 1 is a longitudinal vertical section through line $x\ x$ of fig. 2.

The object of this invention is to provide, for public use, a cheap, simple, and effective machine, to be operated by hand, or other power, by which pea-nuts, or the pods of leguminous plants can be readily separated from their vines, and thoroughly cleansed from dirt.

In the drawings—

F represents the frame of the machine.

A, the feed-table, or incline.

B, a revolving toothed cylinder, operating, in connection with a set of upright teeth, $a\ a$, at the lower end of the feed-table, to break up the vines, and loosen the dirt, &c.

C, a revolving brush, arranged behind the cylinder B, and operating to clean the teeth of the latter, and to detach from them any pods or trash that may be adherent thereto, and to throw such substances down upon a sieve beneath.

Figure 2:
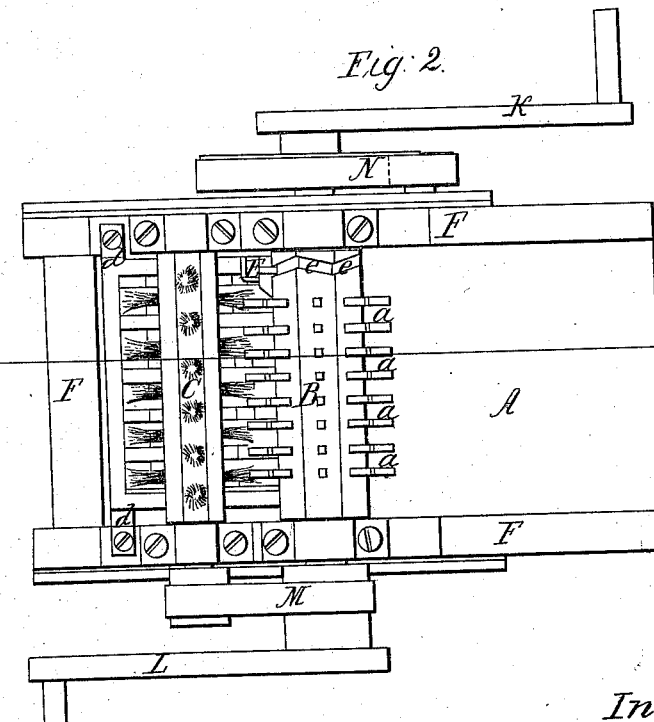
Figure 2 is a top view.

D, the sieve referred to, hung to the frame by straps $d\ d$, and vibrated by means of a lever, E, operated by a cam, $e$, upon cylinder B, as shown in fig. 2.

G, a fan-wheel, partially enclosed in a case, H, and operating to throw a strong current of air both against the sieve D and above and below it, as will readily be understood from fig. 1; and I, an incline, upon which the fruit, purified and separated from the vines, drops from the sieve D, and is discharged into suitable receptacles, the vines, dust, &c., being blown away through the open space J, in the rear end of the machine, by means of the current of air induced by fan G.

The machine is operated by cranks K L, or by pulleys and belting, or gearing, if other than hand-power is employed.

The brush is operated in the same direction as the cylinder, by means of a belt, M, connecting them.

The fan is also operated from the cylinder by means of a belt, N, and the necessary pulleys.

It is evident, that instead of a plain incline, I, constructed as shown, an inclined sieve could be used in its place, and it might be oscillated or not, for the purpose of separating the large from the small fruit, or of more completely driving off the dust, &c.

Having thus described my invention,

What I claim, and desire to secure by Letters Patent, is—

The combination of the toothed cylinder B, brush C, sieve F, incline I, fan G, incline A, teeth $a\ a$, and the necessary gearing, or belting, when constructed to operate in the manner described, and for the purpose specified.

ABNER QUINN.

Witnesses:
H. E. SCOTT,
A. E. WRIGHT.